Patented Aug. 26, 1947

2,426,483

UNITED STATES PATENT OFFICE 2,426,483

REACTIVATION OF SULFIDE CATALYSTS

Herman G. Boucher, Wood River, and Thomas F. Leeds, Alton, Ill., assignors to Shell Development Company, San Francisco, Calif., a corporation of Delaware No Drawing. Application April 17, 1945, Serial No. 588,894

2 Claims. (Cl. 252—242)

This invention relates to the reactivation of sulfide type catalysts. More particularly the invention relates to the reactivation of catalysts comprising or consisting essentially of sulfides of one or more metals or groups of metals selected from the class consisting of W, Mo, Ni, W-Ni, W-Co, W-Fe, Mo-Ni, Mo-Co and Mo-Fe.

Various catalysts when used for the treatment of carbonaceous materials and particularly when used at relatively high temperatures become deactivated during use. The length of time that a given catalyst can be profitably employed before such deactivation becomes too severe depends upon the particular treatment and upon the character and composition of the particular catalyst. This is partially due to different causes of the deactivation. In most cases the major cause of the deactivation is the deposition of carbonaceous deposits which cover the catalyst surface. There are cases, however, where other factors appear to be controlling.

Most oxide catalysts become deactivated in a relatively short period of time. Fortunately, in these cases the deactivation is usually primarily due to the deposition of carbonaceous deposits and these catalysts can be regenerated substantially to their initial activity by simply burning off the carbonaceous deposits under controlled conditions. The frequent and periodic regeneration of oxide type catalysts, although rather widely applied, has very great disadvantages which are too well known to require further comment. Consequently in many cases where it has been possible the art has turned to the use of other catalysts which allow substantially continuous operation. One of the chief classes of catalysts coming into consideration for continuous operation comprises a number of catalysts which contain or consist essentially of metal sulfides. These catalysts may, as a rule, be employed over relatively long periods of time without serious loss of activity. These catalysts nevertheless do lose activity in time and must be either discarded, reactivated or regenerated. Unfortunately, however, the metal sulfide catalysts are not susceptible to the simple regeneration treatment supplied to the oxide catalysts. Consequently it is frequently necessary to discard them because of the lack of a practical and effective regeneration treatment. Some of these catalysts can be regenerated by various procedures comprising two, three, or more separate steps, but these methods are not entirely satisfactory not only because they are complicated and time-consuming, but also because the catalyst is appreciably damaged by such treatments. Thus, for example, such treatments generally cause a considerable disintegration of the catalyst particles with the production of catalyst fines which must be removed; also they generally result in a regenerated catalyst which is mechanically weak; also they generally result in a regenerated catalyst which although of a suitable initial activity declines in activity at a much faster rate than the fresh catalyst.

The catalysts with the reactivation of which the present invention is concerned, constitute a subclass of sulfide catalysts. These catalysts, consisting of or containing as a predominant active constituent one or more sulfides of the metals selected from the group consisting of W, Mo, Ni, W-Ni, W-Co, W-Fe, Mo-Ni, Mo-Co and Mo-Fe, are excellent catalysts for dehydrogenation, hydrogenation, and certain other reactions. Under the usual conditions of use they decline in activity at a very slow rate and thus may be employed substantially continuously for relatively long periods of time. When the activity of the catalyst has declined to an uneconomical limit the catalyst is sometimes regenerated, but usually it is replaced by fresh or remade catalyst. The regeneration procedure, when applied, generally involves burning the carbonaceous deposits from the catalyst with diluted air under controlled conditions as the first step. Under these conditions the metal sulfides are largely converted to the corresponding oxides. The catalyst after this treatment is sulfided (for example with $H_2S$) under controlled conditions to convert the metal oxides back to the metal sulfides. The resulfided material is then reduced with hydrogen to give the regenerated catalyst. Since the reactors designed for substantially continuous operation are usually not suitable for effecting such a regeneration treatment and also since the regeneration treatment causes considerable disintegration of the catalyst particles with the production of fines which should be screened out, the regeneration treatment is usually carried out in separate equipment expressly designed for the purpose. When using this regeneration method the rate of decline of the catalyst activity with use is found to about double with each regeneration and the strength of the catalyst pellets decreases considerably with each regeneration.

It has now been found that although over a period of use there is an appreciable deposition of carbonaceous deposits on the catalyst, the deactivation of these catalysts is primarily due to some other cause and that a very satisfactory reactivation of these catalysts can be carried out under such conditions that neither the carbonaceous deposits nor the combined sulfur is appreciably removed. Thus, it has been found that these catalysts may be reactivated in a single simple step by treatment with air at relatively low temperatures.

The reactivation according to the process of the invention is carried out at a temperature below that at which the usual highly exothermic reaction of the conventional regeneration treatments takes place. The maximum applicable temperature will depend somewhat upon the particular catalyst. Suitable temperatures are, in general, in the order of 350–550° F.; however, somewhat higher or lower temperatures may be applied in some cases. Since the reactivation is not highly exothermic the reactivation may be carried out without diluting the air with flue gas and without elaborate cooling means such as absolutely essential in the conventional regeneration treatments. The use of such diluted air is, however, not excluded. It is merely necessary to avoid temperatures at which appreciable reaction of the carbonaceous deposits or the sulfur sets in. The air is passed through the catalyst bed, if desired in the catalytic reactor, at the specified temperature until the catalyst, upon being put back on stream, is found to be sufficiently reactivated. This may sometimes be effected in 4 or 5 hours, depending upon the size of the catalyst bed, etc., but usually the maximum reactivation is found after a somewhat longer treatment such, for example, as 10–20 hours. After the described treatment it is merely necessary to flush out the air and heat the catalyst to the reaction temperature. No sulfiding treatment is necessary and in fact in most cases where a subsequent sulfiding treatment was tried, no improvement could be noted. Only in the rare case where the catalyst has become deficient in sulfur during the processing does a subsequent treatment with hydrogen sulfide show any improvement.

The following non-limiting examples are submitted merely to illustrate typical applications of the process of the invention and to illustrate the results which may be expected by such treatment.

*Example I*

The catalyst treated was a catalyst consisting essentially of sulfides of nickel and tungsten having a mol ratio of nickel to tungsten of 1.5:1. This catalyst in the form of pellets was used in a dehydrogenation plant for the dehydrogenation of a petroleum fraction rich in methylcyclohexane for a total period of 3,795 hours with no previous regeneration. At the end of this period of use the activity of the catalyst (expressed in terms of the percent conversion of methylcyclohexane in the feed) had declined to 63. The catalyst at this time contained 20.0% sulfur and an appreciable though undetermined concentration of carbonaceous deposits. Undiluted air in an amount equivalent to 9,540 standard cubic feet per hour per barrel of catalyst was passed through the catalyst for about 9 hours. The temperature was below that at which the customary exothermic reaction sets in and was about 490° F. After this treatment the catalyst was found to contain 18.5% sulfur and when used under previous conditions had an activity of 80.

*Example II*

The catalyst treated was a catalyst of the same composition as that of Example I which had been used in a dehydrogenation plant as in Example I for a total period of 5,857 hours with two previous regenerations. The catalyst at this time contained about 4.7% carbon as carbonaceous deposits and had an activity of 37. This catalyst was treated with air as described in Example I. Analyses of the exit gases during the treatment were as follows:

|  | 1 hour | 2 hours |
|---|---|---|
| $CO_2$ | 0.5 | 0.2 |
| $CO$ | 0.2 | 0.2 |
| $O_2$ | 19.5 | 19.7 |

The catalyst after this treatment contained about 4.8% carbon as carbonaceous deposits. In other words the amount of carbon was the same within the analytical error. When employed under the previous conditions its activity was, however, 80.

We claim as our invention:

1. Process for the reactivation of metal sulfide catalysts selected from the class consisting of the sulfides of W, Mo, Ni, W-Ni, W-Co, W-Fe, Mo-Ni, Mo-Co and Mo-Fe, which comprises treating the partially spent catalyst for several hours with a stream of air at a temperature between about 350° F. and 550° F., but below that at which active exothermic reaction of the carbonaceous deposits or the sulfur sets in, whereby the catalytic activity of the catalyst is restored without appreciable oxidation of carbonaceous deposits.

2. Process according to claim 1 in which the catalyst is a composite tungsten sulfide-nickel sulfide catalyst in which the nickel is in mol excess with respect to the tungsten.

HERMAN G. BOUCHER.
THOMAS F. LEEDS.

REFERENCES CITED

The following references are of record in the file of this patent:

UNITED STATES PATENTS

| Number | Name | Date |
|---|---|---|
| Re. 22,097 | Wells | May 12, 1942 |